US006965394B2

(12) United States Patent
Gutta et al.

(10) Patent No.: US 6,965,394 B2
(45) Date of Patent: Nov. 15, 2005

(54) REMOTE CAMERA CONTROL DEVICE (75) Inventors: Srinivas Gutta, Buchanan, NY (US); Miroslav Trajkovic, Ossining, NY (US); Antonio Colmenarez, Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 312 days.

(21) Appl. No.: 09/822,625

(22) Filed: Mar. 30, 2001

(65) Prior Publication Data

US 2002/0140803 A1  Oct. 3, 2002

(51) Int. Cl.$^7$ ............................................. H04N 7/14
(52) U.S. Cl. ............................ 348/14.05; 348/211.8; 382/117
(58) Field of Search ........................ 348/14.01–14.03, 348/14.05, 14.07–14.1, 14.14–14.16, 169, 348/207.99, 207.1, 207.11, 208.14, 211.99, 348/211.8, 211.12–211.14, 373–386, 333.03; 396/51, 58; 382/103, 107, 117–118, 236

(56) References Cited

U.S. PATENT DOCUMENTS

| | | | |
|---|---|---|---|
| 4,720,805 A * | 1/1988 | Vye ............................... 700/85 |
| 5,065,249 A | 11/1991 | Horn et al. ................... 348/376 |
| 5,245,381 A * | 9/1993 | Takagi et al. ................ 396/287 |
| 5,396,287 A * | 3/1995 | Cho ........................... 348/211.8 |
| 5,434,617 A | 7/1995 | Bianchi ........................ 348/170 |
| 5,438,357 A | 8/1995 | McNelley ...................... 348/15 |
| 5,515,130 A * | 5/1996 | Tsukahara et al. ............. 396/51 |
| 5,523,783 A | 6/1996 | Cho ............................. 348/169 |
| 5,550,754 A | 8/1996 | McNelley et al. ....... 364/514 A |
| 5,568,183 A * | 10/1996 | Cortjens et al. ............ 348/14.1 |
| 5,623,703 A * | 4/1997 | Takagi et al. .................. 396/51 |
| 5,627,621 A * | 5/1997 | Kodama ...................... 396/373 |
| 5,659,361 A | 8/1997 | Jin .............................. 348/375 |
| 5,839,000 A * | 11/1998 | Davis et al. ................... 396/51 |
| 5,845,009 A * | 12/1998 | Marks et al. ................ 382/228 |
| 5,912,705 A * | 6/1999 | Saruwatari ............. 348/333.03 |
| 5,912,721 A * | 6/1999 | Yamaguchi et al. ......... 351/210 |
| 5,929,904 A | 7/1999 | Uchida ..................... 348/211.7 |
| 6,275,258 B1 | 8/2001 | Chim .......................... 348/211 |
| 6,307,589 B1 * | 10/2001 | Maquire, Jr. ............ 348/333.03 |
| 6,380,968 B1 * | 4/2002 | Alexander et al. ........ 348/14.05 |
| 6,411,209 B1 * | 6/2002 | Lyons et al. ................. 340/541 |

FOREIGN PATENT DOCUMENTS

| | | | | |
|---|---|---|---|---|
| JP | 11355617 A | * | 12/1999 | .......... G03B 17/02 |
| WO | WO 9214982 A1 | * | 9/1992 | ............. F41G 3/02 |

OTHER PUBLICATIONS

Patents Abstracts of Japan, Tsuchida Katsuya, "Gaze Detection System," Publication No. 10091325, Apr. 10, 1998, Application No. 08243832, Sep. 13, 1996.

* cited by examiner

Primary Examiner—George Eng (57) ABSTRACT

A camera system comprising a camera, a monitor, an image detector, a touch screen, and a remote control. The monitor displays a field of view of a lens of the camera. The image detector provides a viewer image to the remote control whereby the remote control can determine a desired image within the field of view that the viewer is gazing upon. The touch screen enables a viewer of the monitor to point to the desired image of the field of view and provides signal(s) indicative of the pointing. The remote control is operable to activate various drives to pan and/or tilt the camera, or to zoom and/or focus the lens to the desired image and to follow any movement of the image within the field of view.

2 Claims, 8 Drawing Sheets

REMOTE CAMERA CONTROL DEVICE

BACKGROUND OF THE INVENTION

1. Field of the Invention

The present invention generally relates to camera control devices. The present invention specifically relates to remotely controlling a camera by a utilization of an unattached monitor.

2. Description of the Related Art

Remotely controlling a pan operation (horizontal orientation), a tilt operation (vertical orientation) and a zoom operation of a camera is known in the art. For example, U.S. Pat. No. 5,929,904 discloses a mounted video camera that can be panned and tilted at desired angles as well as selectively zoomed to obtain a desired image. U.S. Pat. No. 5,929,904 further discloses an unattached monitor having push buttons to remotely control the pan, tilt, and zoom operations of the video camera.

The present invention is directed to advancing the art of remotely controlling video cameras.

SUMMARY OF THE INVENTION

Various aspects of the invention are novel, non-obvious, and provide various advantages. While the actual nature of the present invention covered herein can only be determined with reference to the claims appended hereto, certain features, which are characteristic of the embodiments disclosed herein, are described briefly as follows.

The present invention is a device for controlling a camera having a lens. The device comprises a monitor and a remote control. The monitor is operable to display a field of view of the lens.

In one aspect, the device further comprises an image detector operable to provide an image of a viewer of the field of view as displayed by the monitor. The remote control is operable to determine a gaze by the viewer upon an image in the field of view in response to the viewer image. The remote control is further operable to zoom or focus the lens in a direction of the image in the field of view.

In a second aspect, the device further comprises a touch screen operable to provide one or more signals indicative of a viewer pointing on the touch screen in a direction of an image in the field of view. The remote control is operable to zoom or focus the lens in a direction of the image in the field of view as indicated by the signals.

In a third aspect, the remote control is operable to selectively adjust a pan orientation and a tilt orientation of the camera and selectively adjust the zoom and focus of the lens as a function of any movement of an image within the field of view.

The foregoing forms and other forms, features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

DETAILED DESCRIPTION OF THE PRESENTLY PREFERRED EMBODIMENTS

Figure 1:
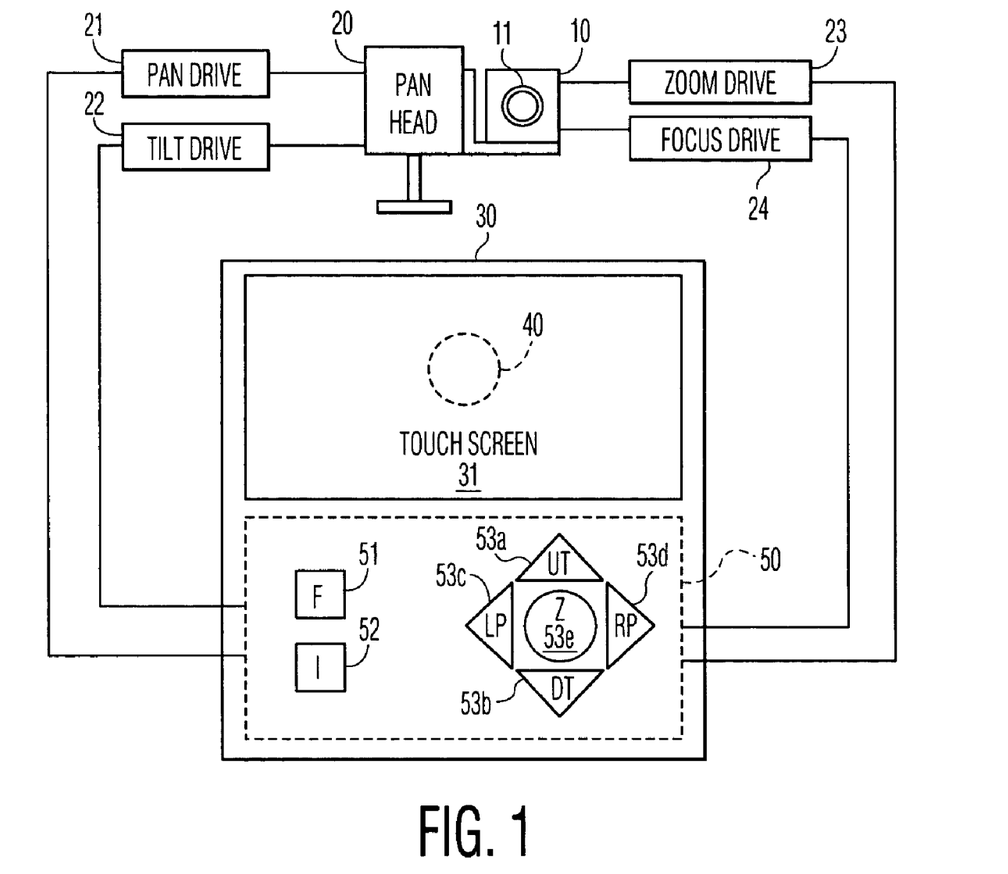
FIG. 1 is a view of one embodiment of a camera system of the present invention.

FIG. 1 illustrates a camera system of the present invention that comprises a camera 10, a pan head 20, a monitor 30, a detector 40, and a remote control 50.

Camera 10 is a conventional apparatus including a shuttered lens 11 through which an image of an object within a field of view of lens 11 can be focused upon. A conventional zoom drive 23 and a conventional focus drive 24 adjusts lens 11 as directed by remote control 50.

Pan head 20 is a conventional mounting stand for panning and tiling camera 10 whereby lens 11 is disposed at desired panning and tilting angles. A conventional pan drive 21 provides a signal to pan head 20 that is indicative of the desired panning angle of camera 10 as directed by remote control 50. A conventional tilt drive 22 provides a signal to pan head 20 that is indicative of the desired tilting angle of camera 10 as directed by remote control 50.

Monitor 30 is a conventional device for displaying the field of view of lens 11. Monitor 30 includes a conventional touch screen 31 mounted over a display surface (not shown). Touch screen 31 provides a signal to remote control 50 that is indicative of a pointing on touch screen 31 by a viewer in a direction of an image in the field of view of lens 11 as displayed by monitor 30.

Detector 40 is a conventional device for providing an image of a viewer gazing upon an image in the field of view of lens 11 as being displayed by monitor 30. Detector 40 is positioned behind the display surface of monitor 30 to provide the viewer image to remote control 50.

Remote control 50 is housed within monitor 30 with several push buttons extending through monitor 30. A focus push button 51 is for activating an image focusing routine 60 of remote control 50 as will be subsequently described herein. An image push button 52 is for activating an image monitoring routine 70 of remote control 50 as will be subsequently described herein. An up tilt push button 53a is for directing pan head 20 via tilt drive 22 to upwardly camera 10. A down tile push button 53b is for directing pan head 20 via tilt drive 22 to downwardly tilt camera 10. A left push button 53c is for directing pan head 20 via pan drive 21 to pan camera 10 in a left direction. A right push button 53d is for directing pan head 20 via pan drive 21 to pan camera 10 in a right direction. A zoom push button 53e is for directing camera 10 via zoom driver 23 to zoom lens 11 in or out of a current field of view.

Figure 2:
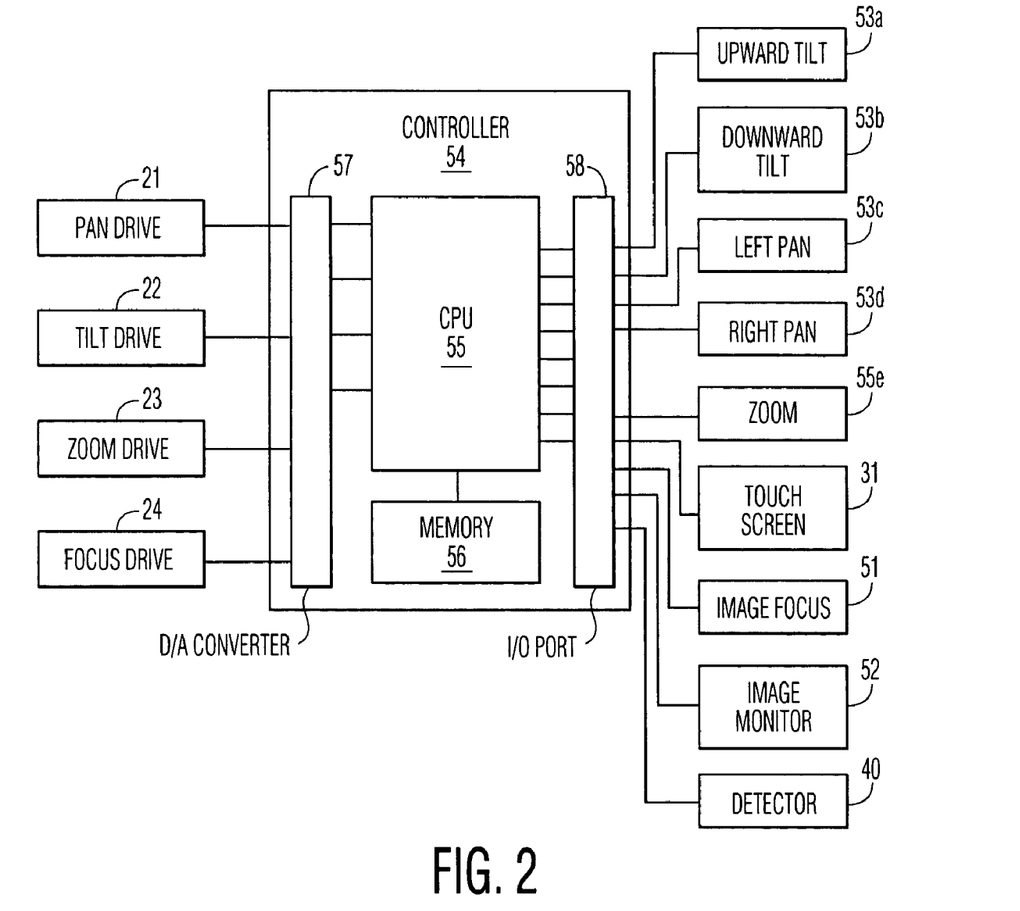
FIG. 2 is a block diagram of one embodiment of a remote control of the FIG. 1 system.

Referring to FIG. 2, a controller 54 of remote control 50 is shown. Controller 54 is an electronic circuit comprised of one or more components that are assembled as a common unit. Controller 54 may be comprised of analog circuitry, and/or digital circuitry. Also, controller 54 may be programmable, a dedicated state machine, or a hybrid combination of programmable and dedicated hardware. To implement the principals of the present invention, controller 54 can further include any control clocks, interfaces, signal conditioners, filters, Analog-to-Digital (A/D) converters, Digital-to-Analog (D/A) converters, communication ports, or other types of operators as would occur to those having ordinary skill in the art.

In the illustrated embodiment, controller 54 includes a central processing unit (CPU) 55, a solid-state memory 56, a Digital-to-Analog (D/A) converter 57, and an input/output (I/O) port 58. Memory 56 contains programming for an implementation by CPU 55 of image focusing routine 60 (FIG. 3), image monitoring routine 70 (FIG. 4), and an image pointing routine 80 (FIG. 5).

Figure 3:
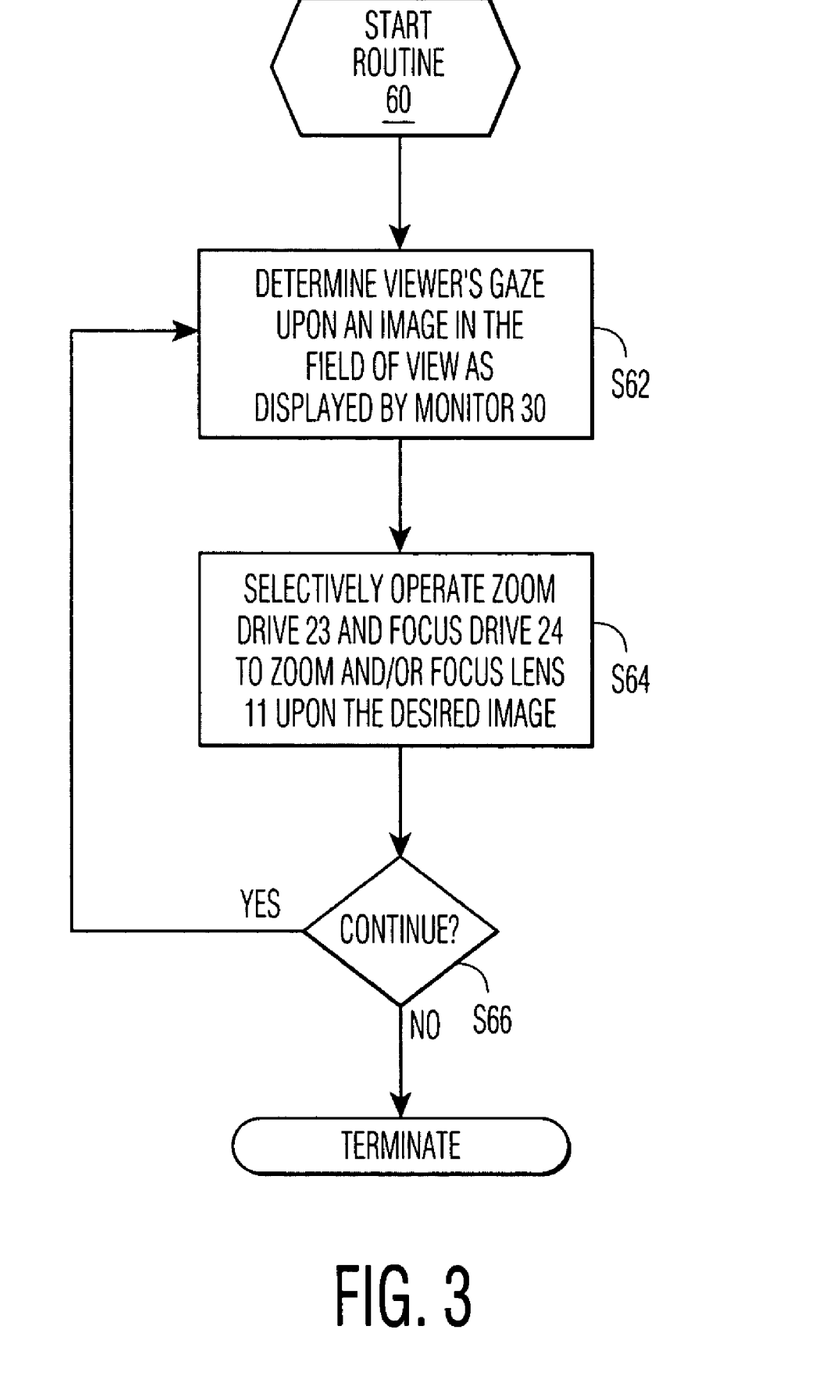
FIG. 3 is a flow chart of an image focusing routine of the present invention.
Figure 6A:
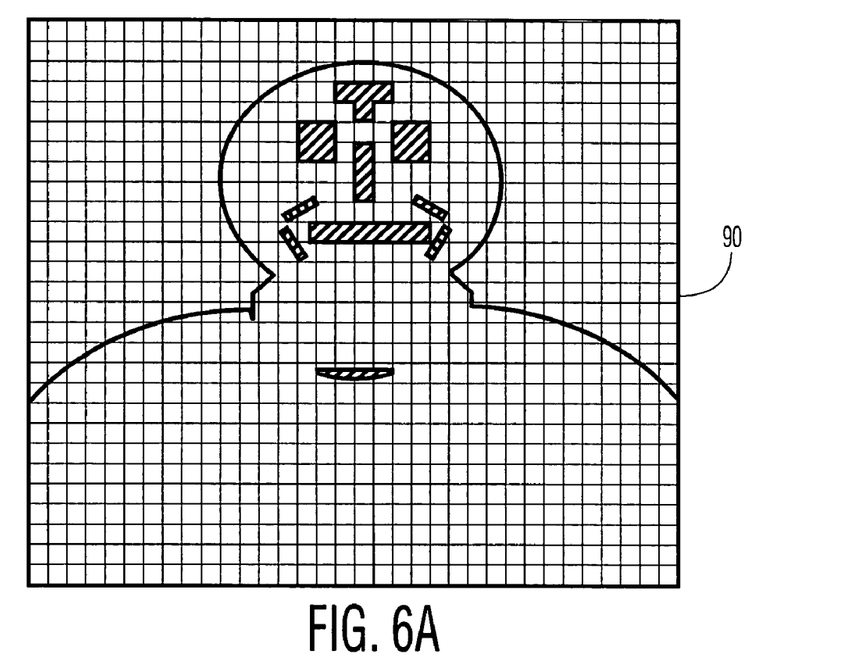
FIG. 6 illustrates a pair of exemplary images provided by an image detector of the FIG. 1 system during an implementation of the FIG. 3 routine.
Figure 6B:
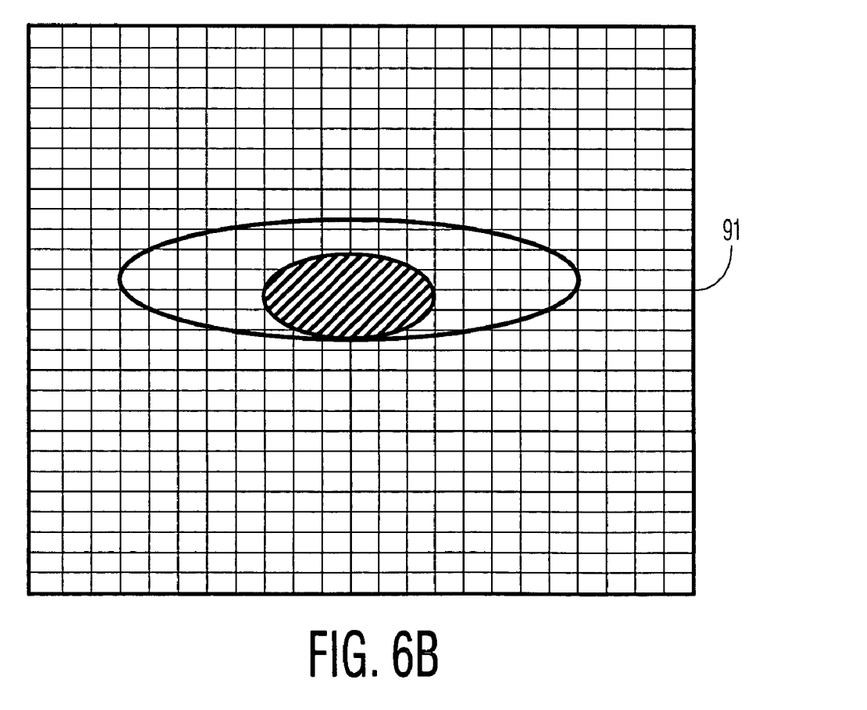

Referring to FIGS. 1–3, CPU 55 initiates routine 60 upon a reception of a start signal from an activation of image focus push button 51. During a stage S62 of routine 60, CPU 55 determines a viewer's gaze upon an image in the field of view of lens 11 as being displayed by monitor 30 in response to an image of the view from image detector 40. In one embodiment, detector 40 supplies an image of the viewer's face, and CPU 55 transforms the image to generate a window of white, gray and black pixels forming the viewer's face based on a pattern recognition technique as known in the art, such as, for example, a statistical technique, a syntactical technique, a neural technique, and an entropy analysis involving non-parametric probability estimators. An exemplary window 90 of pixels of a viewer's face is shown in FIG. 6. Referring additionally to FIG. 6, the recognition of a outer corner of either eye is used a reference for generating a window of white, gray and black pixels focused on the reference eye to determine an orientation of the pupils of the eyes. An exemplary window 91 of pixels of an eye of the viewer is also shown in FIG. 6.

Referring again to FIGS. 1–3, during a stage S64 of routine 60, CPU 55 selectively operates zoom drive 23 and focus drive 24 to zoom and/or focus lens 11 to the image being gazed upon by the viewer. In one embodiment, CPU 55 applies a non-parametric model for background subtraction as known in the art to extract the image from the field of view of the lens 11, and provides appropriate signal(s) to zoom drive 23 and/or focus drive 24 to bring out the image. For example, referring to FIGS. 6 and 7, a field of view 92 of lens 11 includes a dog with trees and an airplane in the background. Upon CPU 55 determining a user gaze upon the dog, CPU 55 will apply a non-parametric model for background subtraction to extract the dog from the image as shown in window 93. Then CPU 55 will provide appropriate signal(s) to zoom drive 23 and/or focus drive 24 to bring out the dog as shown in view 94.

During a stage S66 of routine 60, CPU 55 ascertains whether the image focus push button 51 is still activated. If the image focus push button 51 is still activated, CPU 55 repeats stages S62 and S64. If the image focus push button has been inactivated, CPU 55 terminates routine 60.

Figure 4:
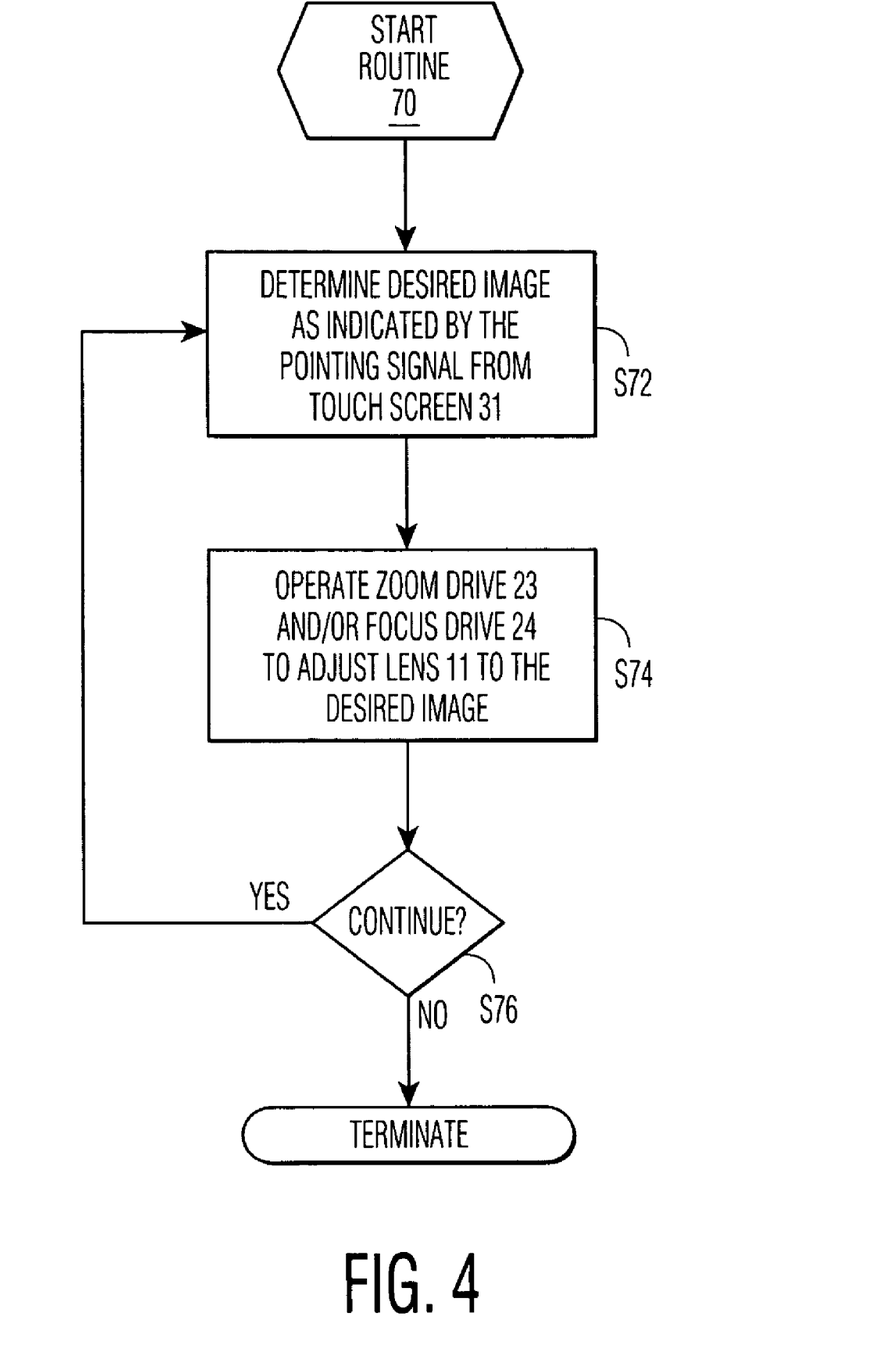
FIG. 4 is a flow chart of an image pointing routine of the present invention.
Figure 5:
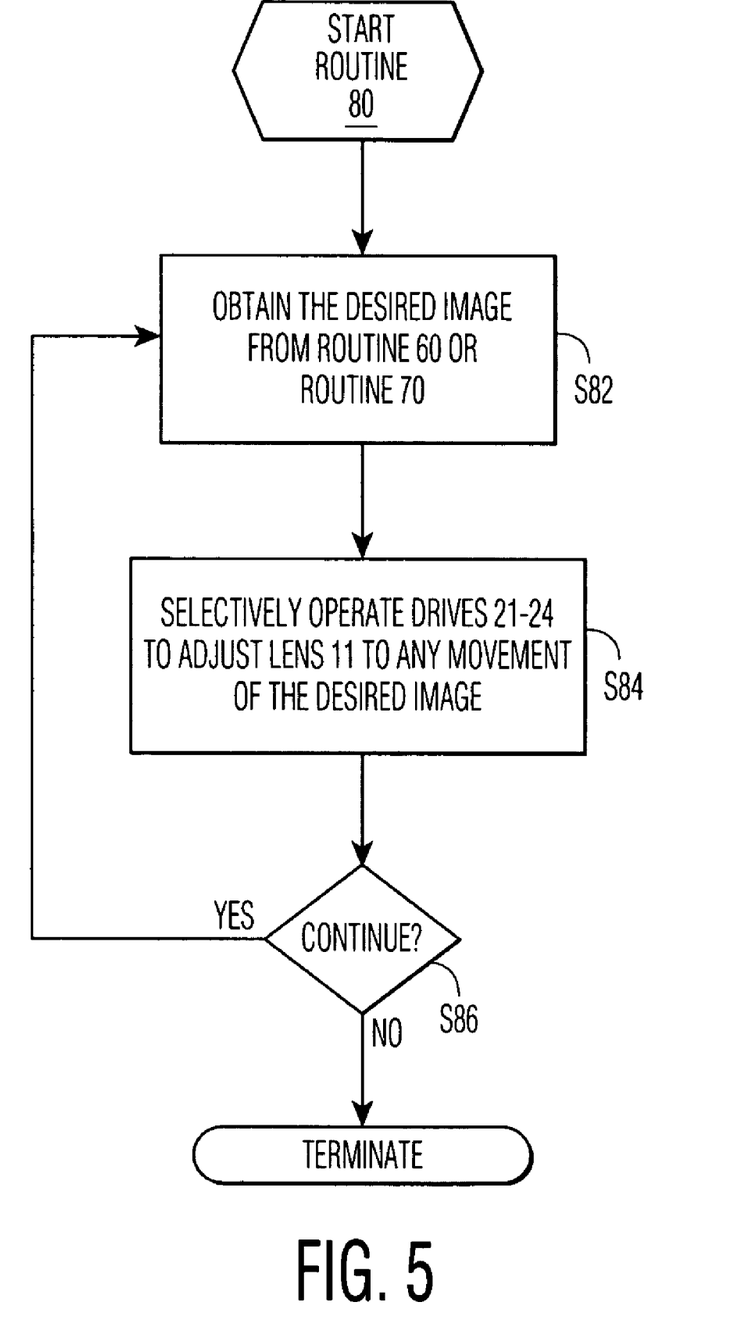
FIG. 5 is a flow chart of an image monitoring routine of the present invention.

Referring to FIGS. 1, 2 and 4, CPU 55 initiates routine 70 upon a reception of a pointing signal from touch screen 40. During a stage S72 of routine 0, CPU 55 determines a desired image as indicated by the pointing signal from touch screen 40. For example, referring to FIG. 8, a view 95 has touch screen 40 thereon. When a user of presses a pixel of screen 40 having a portion of the dog therein, CPU 55 will apply a non-parametric model for background subtraction as known in the art to extract the dog from the field of view of the lens 11 as shown in window 93 of FIG. 7.

Figure 7A:
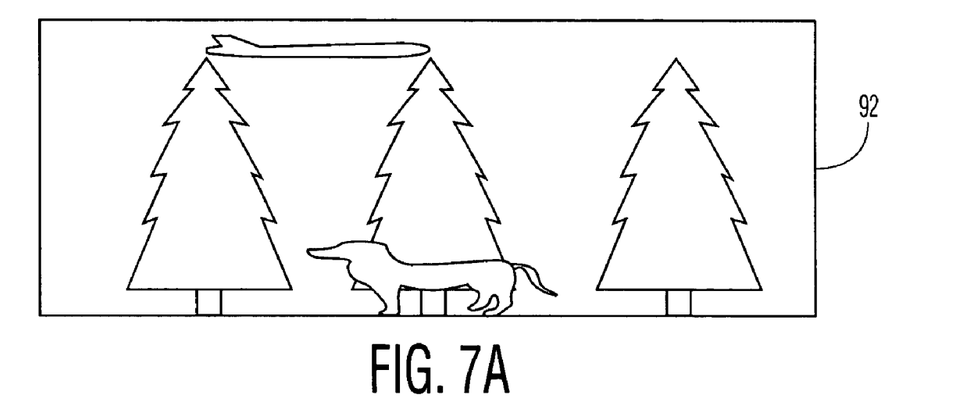
FIG. 7 illustrates an exemplary focusing on an image within a field of view of the FIG. 1 system during an implementation of the FIG. 3 routine or the FIG. 4 routine.
Figure 7B:
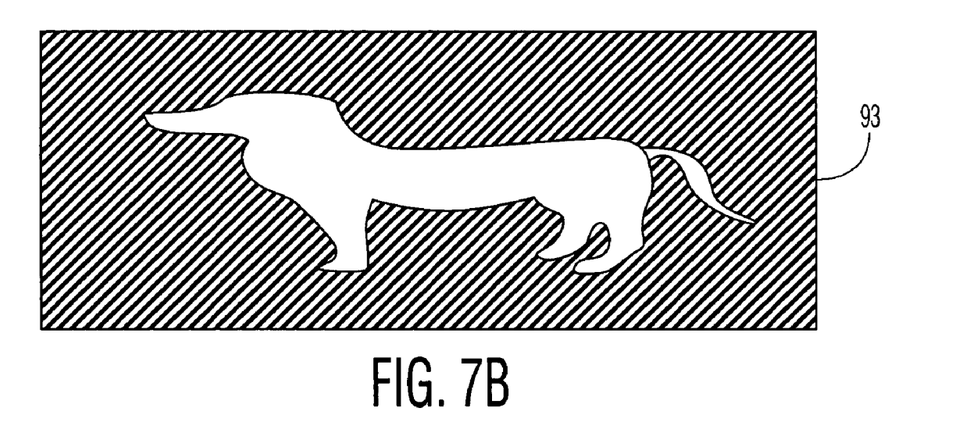
Figure 7C:
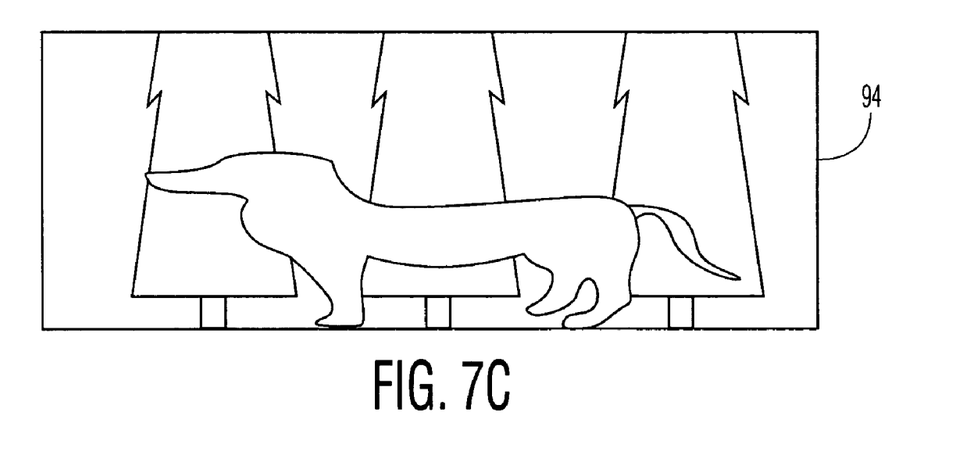
Figure 8:
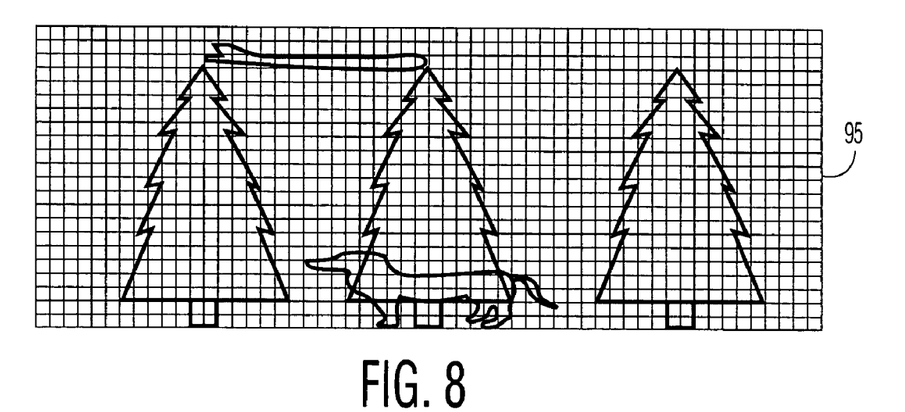
FIG. 8 illustrates an exemplary layout of a touch screen of the FIG. 1 system over a field of view of the FIG. 1 system.

During a stage S74 of routine 70, CPU 55 selectively operates zoom drive 23 and/or focus drive 24 to zoom and/or focus lens 11 (FIG. 1) upon the desired image, such as view 94 of FIG. 7. During a stage S76 of routine 70, CPU 55 ascertains whether touch screen 40 is still being activated. If touch screen 40 is still being activated, CPU 55 repeats stages S72 and S74. If touch screen 40 is inactive, CPU 55 terminates routine 70.

Referring to FIGS. 1, 2 and 5, CPU 55 initiates routine 80 upon a reception of a start signal from an activation of image monitor push button 52. During a stage S82 of routine 80, CPU 55 obtains the desired image from routine 60 or routine 70, whichever routine was most recently implemented.

Figure 9:
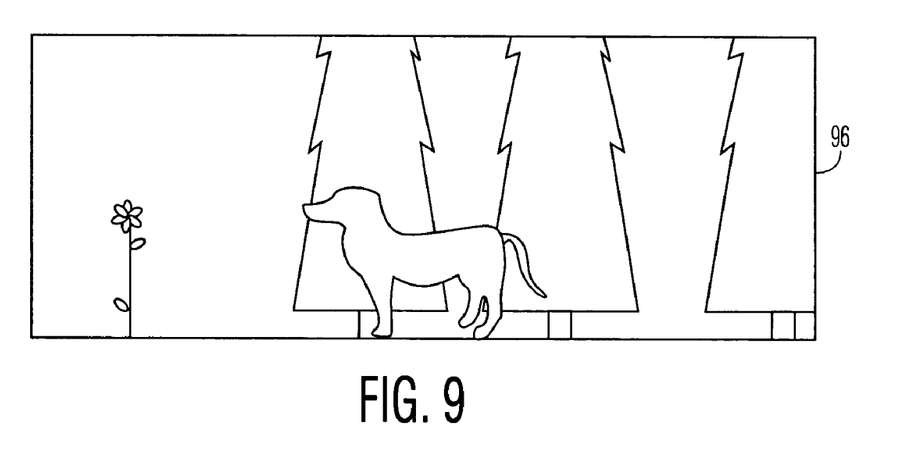
FIG. 9 illustrates an exemplary monitoring of an image within a field of view of the FIG. 1 system during an implementation of the FIG. 5 routine.

During a stage S84 of routine 80, CPU 55 selectively operates drives 21–24 to adjust lens 11 (FIG. 1) to any movement of the desired image. For example, CPU 55 will provide appropriate signal(s) to pan drive 21, tilt drive 22, zoom driver 23, and/or focus drive 24 to center the dog within the field of view of lens 11 as the dog moves as shown in view 96 of FIG. 9. In one embodiment, CPU 55 continues the application of a non-parametric model for background subtraction as applied during routine 60 or routine 70 to continually extract the dog from the field of view of lens 11 to thereby provide the image of the dog as the dog moves.

During a stage S86 of routine 80, CPU 55 ascertains whether the image monitor push button 52 is still activated. If the image focus push button 52 is still activated, CPU 55 repeats stages S82 and S84. If the image focus push button has been inactivated, CPU 55 terminates routine 80.

While the embodiments of the present invention disclosed herein are presently considered to be preferred, various changes and modifications can be made without departing from the spirit and scope of the present invention. The scope of the present invention is indicated in the appended claims, and all changes that come within the meaning and range of equivalents are intended to be embraced therein.

What is claimed is:

1. A device for remotely controlling a camera having a lens, said device comprising:
   a monitor operable to display a field of view of the lens, the field of view including images of a plurality of objects;
   a processor configured to determine a first image of the images of the plurality of objects that is being gazed upon by a viewer by generating an image of the viewer's face, use a pattern recognition technique on the image of the viewer's face to determine an orientation of the pupils of the viewer's eyes wherein a recognition of a outer corner of either eye is used as a reference to determine an orientation of the pupils of the viewer's eyes, use a non-parametric model for background subtraction to extract the first image; and
   a touch screen operable to provide one or more signals indicative of a viewer pointing on the touch screen in a direction of the first image for selectively adjusting a zoom and a focus of the lens in a direction of the first image.

2. The device of claim 1, wherein the processor is further configured to selectively adjusting a pan orientation and a tilt orientation of the camera and selectively adjusting the zoom and focus of the lens as a function of a movement of the first image.

* * * * *